United States Patent

[11] 3,586,433

| [72] | Inventor | Hans Mulch |
| | | Wetzlar, Germany |
| [21] | Appl. No. | 821,449 |
| [22] | Filed | May 2, 1969 |
| [45] | Patented | June 22, 1971 |
| [73] | Assignee | Ernst Leitz GmbH, Optische Werke |
| | | Wetzlar, Lahn, Germany |
| [32] | Priority | May 8, 1968 |
| [33] | | Germany |
| [31] | | P 17 72 390.9 |

[54] CIRCULAR TRAY FOR PHOTOGRAPHIC SLIDES
8 Claims, 6 Drawing Figs.

[52] U.S. Cl. ............................................. 353/117
[51] Int. Cl. ........................................ G03b 21/00
[50] Field of Search ................................. 353/107, 117; 206/73, 62; 40/79

[56] References Cited
UNITED STATES PATENTS

| 3,402,489 | 9/1968 | Schlessel | 40/79 X |
| 3,469,910 | 9/1969 | Badalich | 353/117 |

*Primary Examiner*—Harry N. Haroian
*Attorney*—Smyth, Roston and Pavitt

ABSTRACT: A two part tray is disclosed in which an outer part is established by peripheral rings and the slide compartment defining partitions extend therefrom radially inwardly. The inner part is to remain stationary, axial retaining flanges and hub serving as stop for the slides. The retaining flanges and hub have openings through which a slide gripper of a projector can reach for removing the slide in the compartment registering with the openings. One of the retaining flanges has fasteners for positioning the stationary part relative to a projector.

PATENTED JUN22 1971

CIRCULAR TRAY FOR PHOTOGRAPHIC SLIDES

The invention is related to a circular tray for photographic slides and which is composed essentially of two parts being rotatable relative to each other. One of these parts is provided with radially extending dividers, establishing radially extending compartments for receiving individual slides; the other part is provided with covering means, or the like, for preventing slides in the compartments from dropping out. The latter part of the tray has but one opening of a width equal to the width of a single compartment; a single slide can be removed from any compartment which registers with the opening.

A circular tray having these features is known in accordance with the teachings of U.S. Pat. No. 2,748,653. Additional features of the tray disclosed in that patent include an inner part provided with a hollow hub having radial slots for receiving individual slides. The slots define slide compartments which are open along the periphery, as well as on one axially facing side of that part. The second part envelopes the hollow hub and is journaled upon the hollow hub but is inhibited from axial displacement relative to the hub.

The hollow hub is coupled to the projector drive for rotary slide transposition, and for this purpose the hollow hub is provided with a groove running parallel to the axis of the rotation. The projector drive includes a shaft carrying a follower cam which engages this groove. The outer part against which the slides bear along the periphery of the circular tray, has an opening into which a gripping member of the slide exchange mechanism can reach to fetch from or to return to the compartment registering with the opening a slide. It is necessary to accurately orient this opening to the slide changing mechanism and, therefore, the outer part of the circular tray having this opening is additionally provided with another opening into which can be placed an indexing pin which projects from and is part of the projector.

This type of tray has certain advantages, for example, over other types of circular trays such as disclosed in a German printed patent application No. 1,253,930. The construction in accordance with the U.S. Pat permits mounting of the slides in the several compartments without requiring springs therein, securing the slides against dropping out. Moreover, the tray as disclosed in the U.S. patent permits use of a slide exchange mechanism which is comprised of a rather short gripper rather than the usually employed large slide changer.

On the other hand, the circular tray in accordance with U.S. patent has the disadvantage that it cannot be inserted in a projector in which normally straight trays of conventional construction are used and utilizing the same slide gripping mechanism. This alternative usage is particularly not possible in those cases where slides are gripped and lifted out of a straight tray from the top. If a circular tray were placed in position, the slide gripper operating from the top as far as a straight tray is concerned would necessarily collide with parts of the circular tray. Particularly, there will be a position conflict with the drive shaft for the circular tray and the protracting slide exchange mechanism.

It is an object of the present invention to suggest a construction for a circular tray obviating the deficiencies while retaining the advantages of known circular tray constructions. In particular, fastening or securing springs in the several compartments are to be avoided as they render slide transportation more difficult, but, of course, the slides must be retained securely in the several compartments. Moreover, the circular tray should be constructed such that it can be used in the alternative, i.e., in lieu of a straight tray of usual construction, whereby particularly the construction of the circular tray must be suitable for any kind of slide changing mechanisms as they are being used in different types of projectors.

In accordance with one aspect of the present invention, in the preferred embodiment thereof, it is suggested to provide a slide tray of circular construction with the following features coacting in combination: As stated above, the tray is composed of two concentrical parts, rotatable relative to each other; the radially extending compartments are defined through partitions or the like extending radially, inwardly from the outer one of the two parts, so that the compartments as to that part are open where facing the axis of rotation. The outer part having the compartment defining partitions or the like is provided in addition with gearing to permit stepwise rotation. The inner part is provided with a hollow hub which retains the radially inwardly extended slides in the several compartments but is not affixed to the partitions. The hollow hub is further provided with axial retaining walls for retaining the slides in the several compartments. The retaining walls, as well as the hub itself has open aperture defining construction establishing gaps. The inner part, which includes axial retaining walls and hollow hub, is provided with fastening elements having particular orientation to the above-mentioned openings, to define a desired position of the circular slide tray as a whole. This fastening element or elements is (are) provided for cooperation with matching counterparts of the projector for locking the inner part of the slide tray in a particular position relative to the projector. The fastening elements are preferably constructed so that they become effective as the tray is placed in position for cooperation with the projector. For example, plug-in type elements can be on one of the axial retaining walls of tray protruding laterally therefrom and to such an extent that they can be plugged into receiving plugs in the projector. The fastening elements may be constructed as two tongues which are placed on adjacent sides of the apertures and openings in the tray through which the slides pass. Alternatively, it is possible to employ a detent type locking lock instead. In accordance with another feature of the invention, the outer one of the two tray parts having the compartments is provided with a ring-shaped, low-level ledge, preventing particularly slides from dropping through the opening through which the slides pass during slide exchange.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings in which:

Figure 5:
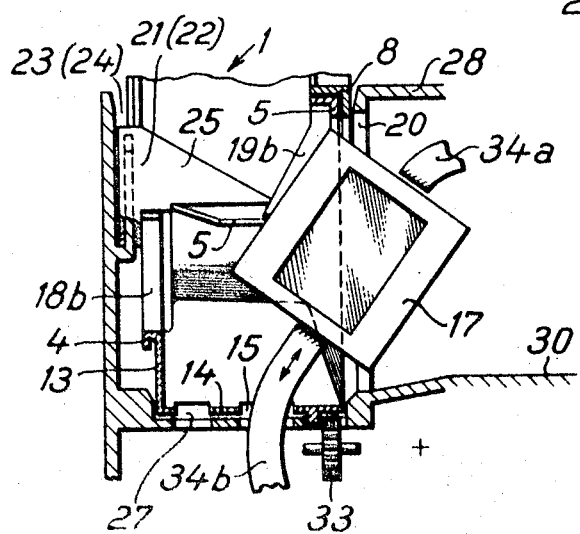
Figure 6:
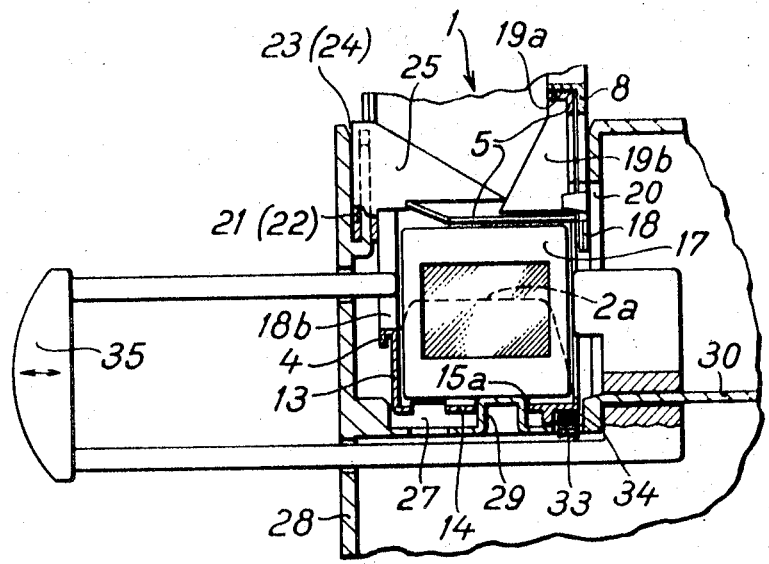

FIG. 5 illustrates a section view into a projector with a different type of slide exchange mechanism having curved transport arms and as cooperating with a circular slide tray in accordance with the present invention; and FIG. 6 illustrates a section view into still another slide projector having still another type of slide exchange mechanism and cooperating with a slide tray in accordance with the present invention.

Figure 1:
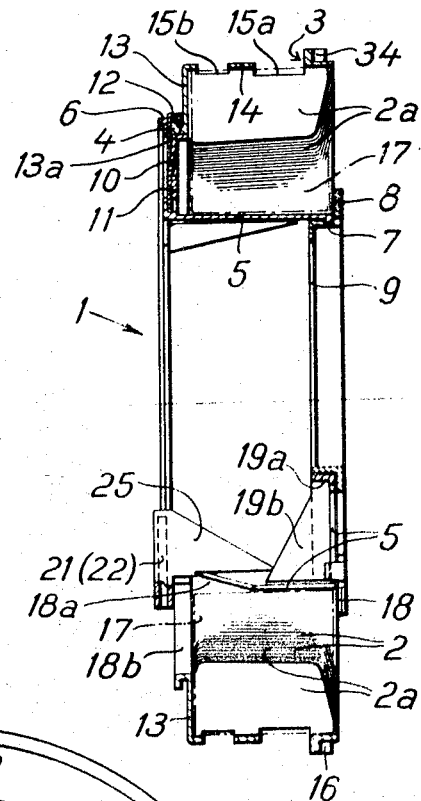
FIG. 1 illustrates a radial section view of a circular tray in accordance with the preferred embodiment of the present invention.
Figure 2:
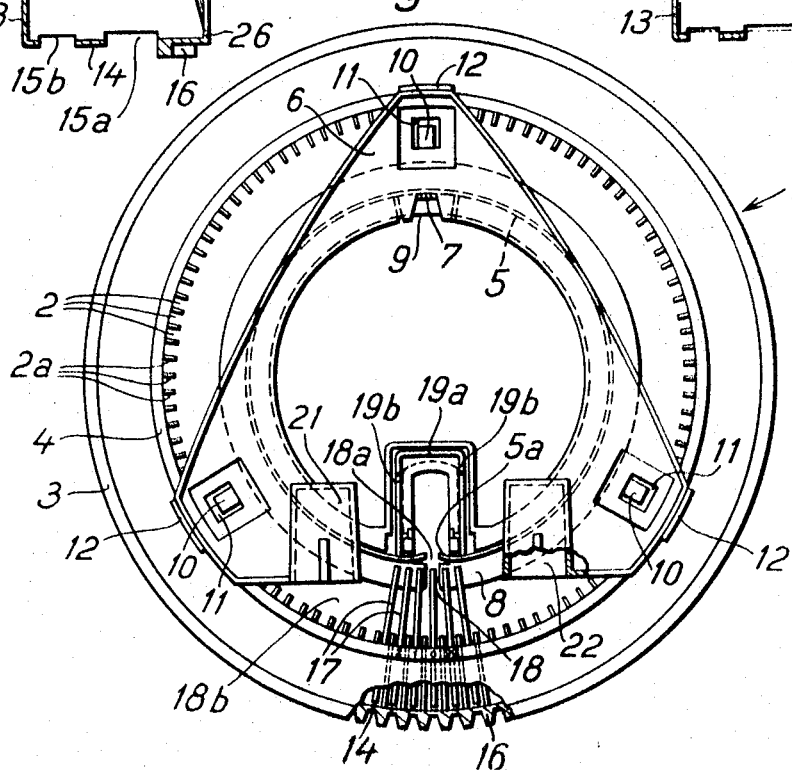
FIG. 2 illustrates a side elevation of the tray shown in FIG. 1.

Proceeding now with the detailed description of the drawings in FIGS. 1 and 2 thereof, there is illustrated a circular tray 1 comprising a first, ring-shaped outer part 3 having partitions 2a which extend radially to define individual, radially oriented compartments 2 for storing slides. Aside from the partitions, part 3 is comprised of additionally parts serving essentially for supporting these partitions: A flat ring 13 extending essentially in an axial plane and having a folded portion 13a defining a circular rail or guide groove extending around the axis. Next there is a cylindrical ring 14 coaxial to ring 13, as well as to a peripheral gear ring 34. The partitions 2a are mounted to all these elements 13, 14 and 34 defining therewith the unified structure 3. However, rings 13, 14 or 34 leave ring-shaped gaps so that the bottoms of the compartments are only partially closed. Moreover, there are indentations 15a and 15b in the several dividers 2a which actually constrict the radial dimensions of the several dividers as between rings 13 and 14, as well as between rings 14 and 34, respectively.

Ring-shaped outer part 3 is concentrically positioned to a second, inner part 4 of the circular tray. Parts 3 and 4 are mounted to each other for relative rotation. Inner part 4 has a hollow, cylindrical hub 5 extending around the principal axis of the circular tray. Hub 5 has a triangular flange 6 flat over one axial end. A ring 9 is placed on the other axial end of hub 5. Ring 9 has an axial portion which is slid into the hub 5 and maintained in position by lugs or detents 7, projecting inwardly from hub 5. Ring 9 in addition is provided with a flangelike border 8, facing away axially from the hub.

Flange 6 is provided with three flat holders 11 respectively having tongues 10 which extend in radial direction but have axially displaced tips respectively bearing against holders 11. The holders 11 are provided with folded over portions on riders 12 to hook into the rail 13a as defined by the folded over counterparts of ring-shaped sidewall 13. As riders 12 engage rail 13a parts 3 and 4 are mounted to each other for relative rotation.

As far as part 3 is concerned, its axial end opposite ring 13 is actually completely open. Accordingly, the compartments for the slides 17 are likewise open in that direction. Compartments for the slides are defined and the slides are retained in the compartments as follows: The slides are retained radially inwardly and they can rest on hub 5 of part 4; radially outwardly the slides are retained by ring 14, by the inner surface of gear ring 34 and by a ledge extending axially from the outer periphery of ring 13. In axial direction the slides are retained in their respective compartments by border ledge 8, which is a ring of low height and extends from ring 9 in hollow hub 5 as one axial retaining wall, otherwise that axial side of the tray is open. Ring 13 and flange 6 serve as retaining walls and close the several compartments partially on the other axial side. One can also say that elements 6, 13, 14, 34, 8 and 5 define a ring-shaped cavity with certain openings, and dividers 2a partition the cavity to form the individual compartments.

The border ledge 8 of part 4 of the circular tray is provided with a narrow gap 18 which is wide enough to permit passage of a slide out of one compartment, in axial direction. Hence, gap 18 defines an opening such that only in the region of that gap can a slide pass axially into and out of the compartment registering with the gap. As tray part 3 rotates about part 4 and relative to gap 18, each compartment can be aligned with that gap. As the tray is expected to be mounted (but does not have to be) to the slide projector for rotation in a vertical plane, the slide will not be itself move out of the compartment aligned with gap 18. Therefore, it must be expected that a slide requires cooperation with a gripping mechanism for removal from the compartment in axial direction. Such gripping mechanism of different kinds of construction must be able to reach into the tray without colliding with any part thereof. In order to permit a slide gripper to reach into the tray, there are provided additional apertures 18a and 18b. Aperture or gap 18 is particularly provided in ledge 8 and ring 9, as stated; aperture 18a extends axially along hub 5, and communicates with gap 18. Aperture or gap 18b can be regarded as further extension of gap 18a but traverses flange 6. All gaps 18, 18a and 18b are aligned in an axial plane, such as the plane of the drawing of FIG. 1. The several gaps and apertures 18, 18a and 18b, of course, tend to weaken the stability of the construction but this weakening is more than offset by means of inner and outer stiffening ribs such as 19a and 19b. Moreover, the ribs 19a and 19b as facing in axial direction defining a window which is a radially inward extension of gap 18 in the retaining wall defining ring 8, so that a gripper of a slide exchange mechanism can enter the tray from "above" as far as the compartment with slide about to be moved is concerned.

Aperture and gap arrangement 18, 18a and 18b has to be oriented in relation to a plane in which the slide exchange takes place and particularly in relation to the entrance opening of a projector through which a slide may enter and leave the projector for placement in or removal from projecting position. Therefore, the circular tray must be constructed such that the gaps 18, 18a and 18b can be particularly positioned in relation to such an entrance of a projector. For this purpose, flange plate 6 is provided with two tongues 21 and 22 having stiffening ribs 25. A projector is presumed to be provided with two corresponding and matching pockets. These two tongues 21 and 22 are preferably symmetrically related to aperture and gap arrangement 18, 18a 18b, and correspondingly the pockets in a projector receiving tongues 21 and 22 are symmetrically positioned and oriented to the slide entrance opening in the slide projector. The tongues are placed into the pockets when the slide tray is now placed into operative position with a projector.

The slides are preferably placed into the tray after the ring 9 has been removed from hub 5. This may be advisable for relative fast filling. However, it should be mentioned that actually the tray can be filled through the slot 18, and for this the outer part 3 is simply manually rotated from compartment to compartment, etc., so that one compartment after another index with aperture 18, and a slide can be slipped into the respective compartment aligned with the gap.

Figure 3:
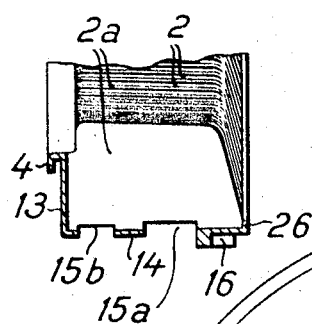
FIG. 3 illustrates a portion of a modified construction in radial section view.

A modification for the tray structure is shown in FIG. 3. The tray construction of FIG. 3 differs from the tray construction as described with reference to FIGS. 1 and 2 in the following detail. Tray element 3 in FIGS. 1 and 2 is not provided with any flange, ledge or the like, coplanar or in the vicinity of the axial plane of extension of ledge 8. In the embodiment illustrated in FIG. 3, however, there is a low level ledge 26 which prevents axial dropping out of a slide in that direction. For all but one compartment this is a redundancy, as ring ledge 8 retains the slides in the compartments on that side except where there is gap 18. Ledge 26, however, extends gapless all around the outer periphery and, therefore, retains also the slide in the compartment aligned with gap 18. The ledge 26 is thus provided to prevent a slide from dropping out of the compartment aligned with gap 18, during handling of the tray. The loading of the tray by slipping slides into the compartments respectively aligned with gap 18 is not impaired by the provision of ledge 26 as it is rather low.

This uninterrupted ledge 26, however, can be provided only if the projector is provided with means which, as far as the projector is concerned, does not just shift a slide out of that one compartment but lifts it out. As to the orientation of the tray, a slide so lifted is to be moved slightly radially inward so that it can clear ledge 26 when moved axially out of the compartment. Of course, it is necessary that the interior of the tray itself has enough space to permit this lifting. This is obtained in particular by the bent off portions 5a of hub 5 as shown in FIG. 2.

Figure 4:
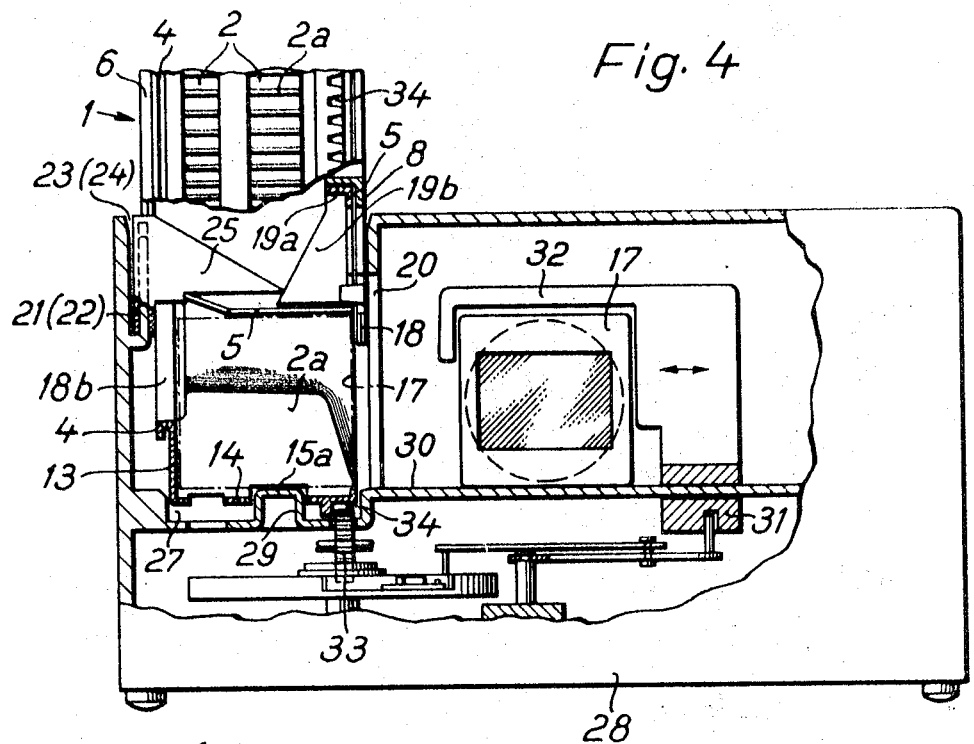
FIG. 4 illustrates the section view of a slide projector with slide exchange mechanism and an inserted circular tray of the type shown in FIG. 3.

After having described the essentials for the novel construction of the circular tray, it will now be described by way of several examples that the tray is of universal construction indeed, permitting cooperation with different types of projectors and particularly with different types of slide exchanging mechanisms thereof. Turning first to FIG. 4, there is disclosed a cross section through a projector 28 having a chute or channel 27 for receiving slide trays. The chute defining sidewall has pockets 23 (24) for respectively receiving positioning tongues 21 (22) of a circular tray so as to particularly position the gaps 18, 18a and 18b in particular relation to the slide entrance 20 of the projector. The interior of the projector includes the usual optical elements which are not shown as they are not pertinent to the invention. Pertinent, however, is that the projector includes a gripper for shifting a slide into the projector. Details of this mechanism will be described below.

The tray is expected to have the retaining ledge 26. The projector is constructed such that the ledge 26 opposite slot 18 of the properly positioned tray is on the same level as the guide or runway 30 on which a slide is slid into the projector and in projecting position therein. This means that without further measures the slide in that compartment would have its lowest edge below that level, because the lowest point of the peripheral portion 14 of the tray is lower than the adjacent portion of ledge 26. For placing the lowest edge of the slide in the level of runway 30 on which it is supposed to run into the projector, a level change of that slide is introduced in that chute or tray guide channel 27 is provided with a ramp 29 for lifting the slide prior to inserting into the projector.

The slide lifting ramp 29 is shown in FIG. 4 in a section through its area of maximum elevation adjacent the entrance 20. This ramp projects into the indentations 15a of the partitions in the circular tray. As a consequence the slide in a compartment into which ramp 29 partially projects is lifted, i.e., shifted in radially inward direction as far as the circular tray is concerned. The ramp is constructed such that a slide is lifted so that its lowest edge is in the level of runway 30 in the projector. A slide thus lifted can now be shifted laterally from the compartment directly onto the runway and will thereby pass over the border ledge 26.

The slide exchange mechanism moves the slide back and forth, viz., between projecting position and compartment. This mechanism includes the gripper 32 and is further comprised of a control member 31 driven through a motor which is not illustrated. The control element 31 is coupled to gripper 32, so that the gripper moves back and forth respectively in two closely spaced parallel planes. As the gripper moves toward the circular tray its arm enters the tray through gap 18 and the window defined by the ribs 19a and 19b, passes the one slide, but passes directly into and through the several apertures 18a and 18b in the inner part 4 of circular tray 1, grips the slide and shifts it onto runway 30 and returns it the same way.

The projector is provided with a step pinion 33 projecting slightly above the bottom level of chute 27 and meshing ring gear 34 of a tray 1, when inserted. The slide change mechanism of the projector in general includes a conventional drive means which rotates pinion 33 by a particular angle for each slide changing step. This angular step is equal to the angular width of an individual compartment. However, the rotation imparted upon the tray by means of pinion 33 is actually imparted upon the outer part 3 of the circular tray only. The part 4 remains stationary as its tongues 21 and 22 are retained in pockets 23 and 24 of the projector. The slides in the upper portion of the tray rest on the upper portion of hub 5, and during rotation of part 3 they slide around and along the hub. After each such rotational step, another slide compartment with a new slide therein becomes juxtaposed to the slot arrangement 18, 18a and 18b and enters the range of the gripper.

It can thus be seen that the slide exchange operation is carried out in exactly the same manner and under utilization of the same transport means in general as in case of a conventional straight tray. The same holds true for the type of slide exchange devices as shown in FIG. 5. The slide exchange mechanism illustrated in FIG. 5 is shown therein, only as to its essential portions, as far as cooperation with the tray is concerned. The slide exchanger includes two plunger-type elements 34a and 34b which pivot the slide into and out of its position in the respective compartment. The opening 15a in tray part 13 serves a different purpose here; opening 15a permits plunger 34b to enter the respective compartment from below for pivoting the slide therein out of the tray and into the projector, while plunger 34a holds the slide and prevents it from dropping. Reverse pivoting returns the slide into its compartment, whereby plunger 34a enters the compartment through gaps 18 and 18a.

A manually operable slide exchange mechanism 35 is illustrated in FIG. 6. This simple changer is constructed such that two oppositely directed arms may traverse a tray from both sides in axial direction. The slide exchanger 35 shifts back and forth. One arm enters opening 18b for pushing a slide into the projector entrance 20 as the exchanger moves in the drawing to the right. As the exchanger moves to the left, the other arm pushes a slide back into the compartment.

The invention is not limited to the embodiments described above, but all changes and modifications thereof not constituting departures from the spirit and scope of the invention are intended to be included.

I claim:

1. A circular tray for photographic slides comprising:

a first essentially central member extending around an axis and a second essentially peripheral member coaxially disposed to the central member, the members having means for rotatably positioning the peripheral member on the central member;

the central member having a hub and radially extending retaining wall means on at least one of the two axial ends of the hub;

the peripheral member having peripheral ring means; hub, retaining walls and ring means defining a ring cavity for storage of the slides;

divider means on the ring means extending radially inwardly therefrom, toward the hub and defining individual compartments of similar dimensions for receiving slides, the retaining wall means of the central member axially retaining the slides in the compartments;

the retaining wall means and the hub of the central member having openings aligned in radial orientation, the aligned openings having width in angular width of a compartment as defined by respectively adjacent two of the dividers, to permit radially inward as well as axial displacement of a slide in the respective one of the compartments which is aligned with the openings; and means on the central member having particular position relative to the openings for particularly positioning the central member to the slide entrance of a slide projector.

2. Circular tray as set forth in claim 1, the means on the central member having a particular position being constructed for plug-in to a projector in direction transverse to the axis of the hub and central member.

3. Circular tray as set forth in claim 1 the positioning means on the central number extending from one of the retaining wall defining means thereof and constructed to extend axially therefrom.

4. A circular tray as set forth in claim 1, the positioning means on the central member comprising two tongues positioned adjacent the openings.

5. Circular tray as set forth in claim 1, the peripheral member having a low level ledge in a radial plane for further retaining the slides in the compartments including the retaining of the slide in the respective compartment aligned with the openings independent from the relative angular position of openings and peripheral member.

6. Circular tray as set forth in claim 1, there being at least one circular gap in the peripheral ring means, the divider means having radial indentations adjacent the gap.

7. Circular tray as set forth in claim 1, the ring means including a first ring of relatively narrow axial dimensions and a second ring axially spaced from the first ring having peripheral gearing.

8. Circular tray as set forth in claim 1, central member and peripheral member being journaled by riders of one of the members riding in a circular rail on the other one of the axial ends.